US012789535B2

(12) United States Patent
Giuliani et al.

(10) Patent No.: US 12,789,535 B2
(45) Date of Patent: Nov. 10, 2026

(54) DECORATION MACHINE FOR DECORATING CONTAINERS WITH MOVABLE LASER DECORATION

(71) Applicant: SIDEL PARTICIPATIONS, Octeville-Surmer (FR)

(72) Inventors: Mattia Giuliani, Mantova (IT); Antonio Mancino, Mantova (IT)

(73) Assignee: SIDEL PARTICIPATIONS, Octeville-sur-Mer (FR)

(*) Notice: Subject to any disclaimer, the term of this patent is extended or adjusted under 35 U.S.C. 154(b) by 0 days.

(21) Appl. No.: 18/875,608

(22) PCT Filed: May 12, 2023

(86) PCT No.: PCT/EP2023/062707
§ 371 (c)(1),
(2) Date: Dec. 16, 2024

(87) PCT Pub. No.: WO2024/235418
PCT Pub. Date: Nov. 21, 2024

(65) Prior Publication Data
US 2025/0178358 A1 Jun. 5, 2025

(51) Int. Cl.
*B41J 3/407* (2006.01)
*B41F 17/18* (2006.01)
*B41J 2/44* (2006.01)

(52) U.S. Cl.
CPC ........... *B41J 3/40733* (2020.08); *B41F 17/18* (2013.01); *B41J 2/442* (2013.01); *B41J 3/40731* (2020.08); *B41P 2217/62* (2013.01)

(58) Field of Classification Search
CPC .... B41J 3/40731; B41J 3/40733; B41J 2/442; B41F 17/18; B41P 2217/62
See application file for complete search history.

(56) References Cited

U.S. PATENT DOCUMENTS 9,032,872 B2 * 5/2015 Uptergrove ........ B41J 11/00214 101/37
2018/0304644 A1 * 10/2018 Koers ........................ B41J 2/21

FOREIGN PATENT DOCUMENTS

DE 102009033810 * 1/2011
DE 102015216026 * 2/2017
(Continued)

OTHER PUBLICATIONS

International Search Report and Written Opinion for PCT/EP2023/062707 Dated Nov. 16, 2023.

*Primary Examiner* — Christopher E Mahoney
*Assistant Examiner* — Marissa Ferguson-Samreth

(57) ABSTRACT

Described is a decoration machine for decorating containers adapted to contain a pourable product. The machine includes: a rotary conveyor for conveying a plurality of containers along a decoration path using a rotary movement; a plurality of support members mounted on the conveyor for being advanced by the conveyor along the decoration path, each support member being integral with the rotary movement to support in advancement a respective container; a plurality of decorating units each configured to print or engrave a decoration on a respective container; wherein each decorating unit is mounted on the conveyor is integral with the rotary movement of the conveyor, and is arranged for decorating each container being supported and conveyed along decoration path by a respective support member, each decorating unit being associated with the respective support member, for printing or engraving a decoration on the respective container supported and conveyed thereon.

9 Claims, 5 Drawing Sheets

(56) References Cited

FOREIGN PATENT DOCUMENTS

| | | | | |
|---|---|---|---|---|
| DE | 102020132134 | | * | 6/2022 |
| DE | 102020132134 | A1 | | 6/2022 |
| EP | 2698256 | | * | 2/2014 |
| EP | 2749501 | A1 | | 7/2014 |
| EP | 2960057 | A1 | | 12/2015 |
| EP | 3434490 | A1 | | 1/2019 |
| EP | 3377325 | | * | 3/2022 |

* cited by examiner

DECORATION MACHINE FOR DECORATING CONTAINERS WITH MOVABLE LASER DECORATION

CROSS-REFERENCE TO RELATED APPLICATIONS

This application is a 371 U.S. National Stage Application of PCT Application Serial Number PCT/EP2023/062707 filed on May 12, 2023 entitled "DECORATION MACHINE FOR DECORATING CONTAINERS WITH MOVABLE LASER DECORATION," the entire contents of which are hereby incorporated herein by reference.

TECHNICAL FIELD

The present invention relates to a decoration machine for decorating containers, such as bottles, jars, flacons or the like, adapted to contain a pourable product, preferably a pourable food product.

BACKGROUND ART

Decoration machines are known for decorating containers adapted to contain a pourable product.

A common widespread type of decoration machine are labelling machines.

In particular, labelling machines are known, which are commonly used to prepare, transport and apply labels onto container such as bottles, flacons, jars or the like, destined to be filled with a pourable product, in particular a pourable food product.

Labelling machines of this sort typically operate with well-known "glued labels", which are cut from a web of labelling material at appropriate lengths, sprinkled with glue and then applied on the containers.

In other embodiments, labelling machines can operate with so-called "sleeve-labels", which are cut from a web of heat-shrinking film, are applied with a certain clearance on the articles, and then heated in an oven to obtain their shrinking and perfect adhesion to the lateral surfaces of the containers.

Regardless of the type of label used, a known labelling machine typically comprises:

- a carousel rotatable around a vertical axis and configured to convey a plurality of containers along a horizontal, arc-shaped labelling path; and
- a labelling module, peripherally arranged relatively to the carousel (i.e. radially with respect to the aforementioned vertical axis) and configured to prepare, transport and feed a plurality of labels to the carousel at an application station, in order to apply such labels to the respective containers.

The carousel comprises a series of support members, for example embodied as support plates, arranged at a peripheral portion thereof and each configured to support a respective container.

The carousel advances the support members along a circular trajectory, so that the containers are advanced along the labelling path.

Typically, the labelling module essentially comprises:

- at least one support shaft around which the web of labelling material is initially wound in form of a reel;
- a feed roller for unwinding the web off the reel and advance it along a feed path;

- a cutting unit for repeatedly cut the web at a cutting station so as to separate a sequence of labels from the web itself; and
- a transfer drum, for example a known vacuum drum arranged peripherally to the carousel, configured to receive, retain by suction and advance each label previously cut and to feed each label to the carousel, at the application station.

In case glued labels are used, the labelling module further comprises a gluing roller arranged peripherally to the transfer drum, for sequentially sprinkling with glue each label retained and transferred by the drum itself.

From the above, it is clear that the known decoration machines comprise a lot of different units and devices and entail the use of several raw materials, which render the decoration process rather cumbersome and complicated, and also difficult to adapt to a container format change.

Accordingly, a need is felt in the sector for improving the flexibility of the known decoration machines, and in particular to ease a format change of the containers.

Furthermore, a need is felt in the sector for reducing the consumption of raw materials used for the known decoration process, such as the labelling material and the glue.

In addition, a need is felt in the sector for improving the recyclability (that is the ease of recycling) of the containers. In fact, at present the containers and the relative decorations may be made in different materials (such as glass bottles with paper or plastic label, or PET bottles with paper or PP labels, and so on).

Ultimately, a need is felt to improve the cleanliness of the decoration process. Especially if glued labels are used, the risk of undesired glue spreading can be high in certain operative conditions.

DISCLOSURE OF INVENTION

It is therefore an object of the present invention to provide a decoration machine which is designed to meet at least one of the above-mentioned needs in a straightforward and low-cost manner.

This object is achieved by a decoration machine as claimed in claim 1.

BRIEF DESCRIPTION OF THE DRAWINGS

A non-limiting embodiment of the present invention will be described by way of example with reference to the accompanying drawings, in which.

BEST MODE FOR CARRYING OUT THE INVENTION

Figure 1:
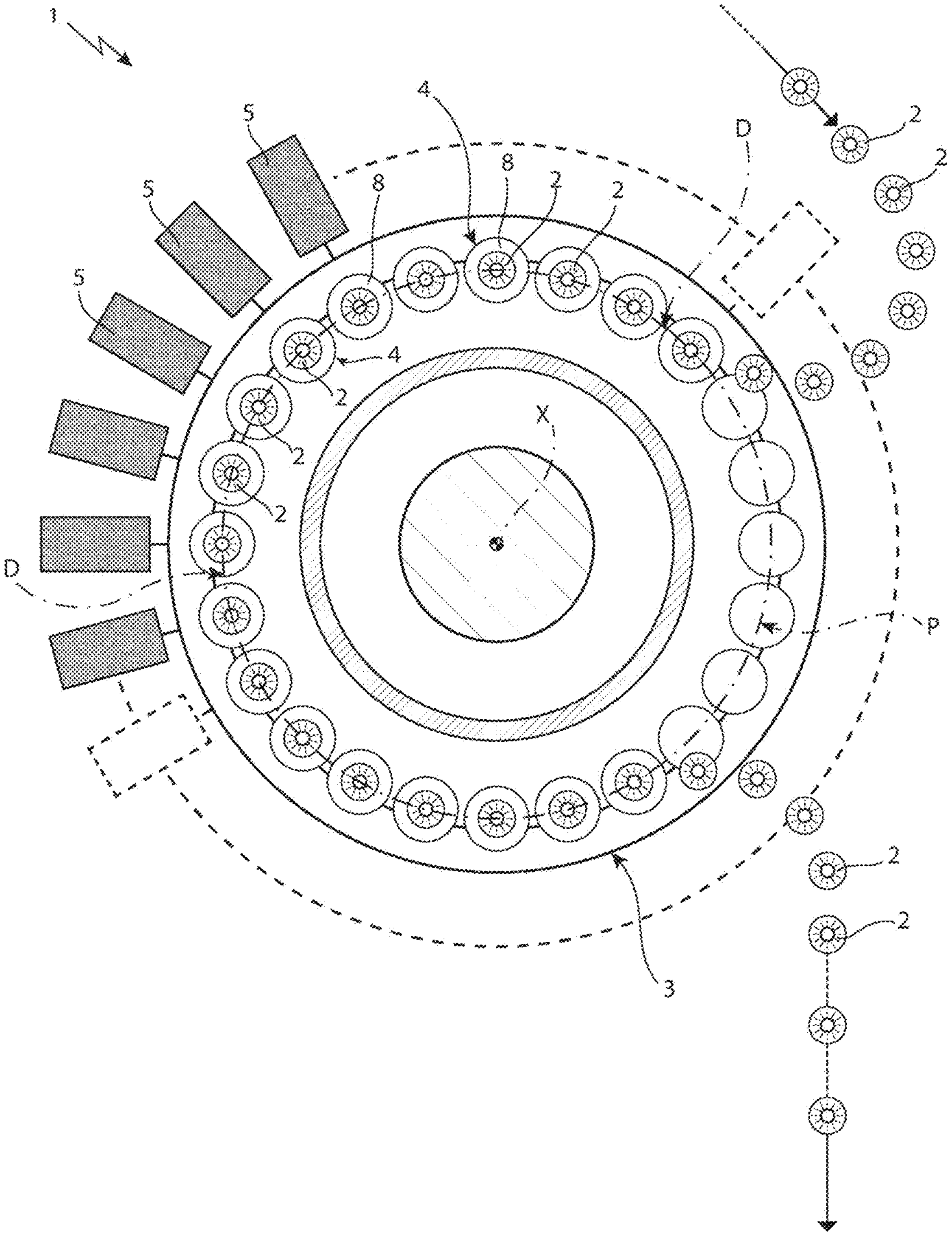
FIG. 1 is a schematic top view, with parts removed for clarity, of a decoration machine according to the present invention.

With reference to FIG. 1, number 1 indicates as a whole a decoration machine for decorating containers 2, such as bottles, jars, flacons or the like, adapted to contain a pourable product, preferably a pourable food product (water, beer, wine, milk, juice, yogurt, or the like).

Containers 2 are preferably made of plastic material, such as PET, or of glass.

Preferably, decoration machine 1 is part of a packaging assembly (not shown) of the known type which is configured for packaging the pourable product by means of the containers 2.

To this end, the packaging assembly may comprise:

- a filling machine for filling containers 2 with the pourable product;
- a capping machine for capping the filled containers; and
- the decoration machine 1.

The machines of the assembly are synchronized to each other during production, to define a synchronized line.

Decoration machine 1 essentially comprises:

- a rotary conveyor, for example a carousel 3 for conveying a plurality of containers 2 along a decoration path D, by means of a rotary movement of the conveyor 3; and
- a plurality of support members 4 mounted on carousel 3 for being advanced by carousel 3 along decoration path D, and each configured to support in advancement a respective container 2.

Each support member 4 is integral with the rotary movement of the conveyor 3.

In detail, carousel 3 is rotatable about a central axis X. The decoration path D is therefore arc-shaped, at limit circular.

The support members 4 are mounted on a peripheral portion of carousel 3 for being advanced along a circular path P integrally with the rotation of the carousel 3 itself.

As visible in FIG. 1, decoration path D stretches along part of circular path P, thereby defining part of circular path P.

In particular, decoration path D extends from an input station, whereby containers 2 are fed to carousel 3, to an output station, whereby decorated containers 2 exit carousel 3, as schematized in FIG. 1.

According to the invention, decoration machine 1 further comprises a plurality of decorating units 5 each configured to print or engrave a decoration on a respective container 2.

According to the invention, each decorating unit 5:

- is mounted on carousel 3, and in particular on the peripheral portion of carousel 3 for being advanced along circular path P;
- is integral with the rotary movement (i.e. with the rotation about axis X) of carousel 3; and
- is arranged for decorating a respective container 2 supported and conveyed along decoration path D by a respective support member 4.

In greater detail, each decorating unit 5 is associated with one respective support member 4 for printing or engraving a decoration on the respective container 2 supported and conveyed thereon.

More specifically, each decorating unit 5 is integral in movement with the respective associated support member 4, for printing or engraving a decoration on the respective container 2 supported and conveyed thereon.

In practice, each decorating unit 5 radially faces towards the same respective support member 4 (and therefore towards the containers 2 carried thereon), while these two are conveyed in rotation by carousel 3.

The decoration may be an aesthetic pattern (a motive, a design, a trademark, etc. . . . ) or an informative pattern (a QR code, a bar code, etc. . . . ), or the like.

According to a preferred embodiment of the present invention, each decorating unit includes a laser device 5 for engraving a decoration of the aforementioned type onto an outer surface of the container 2 supported and conveyed by the associated support member 4.

In detail, such laser device 5 emits concentrated electromagnetic radiation (light) with a defined emission wavelength, thereby generating a sort of micro-burning on the outer surface of the container 2, engraving the decoration thereon.

In light of the above, each laser devices 5 is integral in movement with the rotation of carousel 3 about axis X and with the associated support member 4.

This configuration ensures a proper engraving of the container 2 by means of laser device 5, since laser device 5 follows the relative support plate 4, i.e. the container 2 supported thereon, during its movement along decoration path D.

In other words, since each laser device 5 is integral with the rotation of carousel 3 and follows the associated support member 4, the laser beam has enough time to properly engraving the outer surface of the container 2, in the desired and nominal manner (with respect, for example, to the case in which one or more laser devices are fixed with respect to the rotation of carousel 3 and the movement of the support devices 4, engraving the containers 2 passing in front of them).

The quality of the decoration is therefore improved in an easy and simple manner, and without further consumption of raw materials or use of complicated devices.

According to a further aspect of the invention, decorating units 5 are arranged on carousel 3 in a position more external with respect to support members 4.

In more detail, each laser device 5 is arranged in a position radially more external than the position of the associated support member 4, with respect to axis X.

Opportunely, each laser device 5 points radially inwards towards axis X, in order to engrave the respective container 2.

Thanks to this configuration, the overall safety of the decoration process by laser engraving is improved, since the laser devices 5 are pointing inwards and not outwards, to avoid that the laser beam hits operators or other machines or units, damaging them.

Moreover, this configuration is particularly advantageous also in terms of space: assembling and maintenance of the laser devices 5 are eased, since they are easily accessible even when the machine 1 is loaded with containers 2 and without the need for dismounting any part of the machine 1.

According to an alternative embodiment not shown, decoration units, and in particular laser devices 5, are radially more internal with respect to support members 4, and therefore with respect to the containers 2 carried thereon.

This latter configuration has the advantage that the footprint of the decoration machine 1 is reduced.

Figure 5:
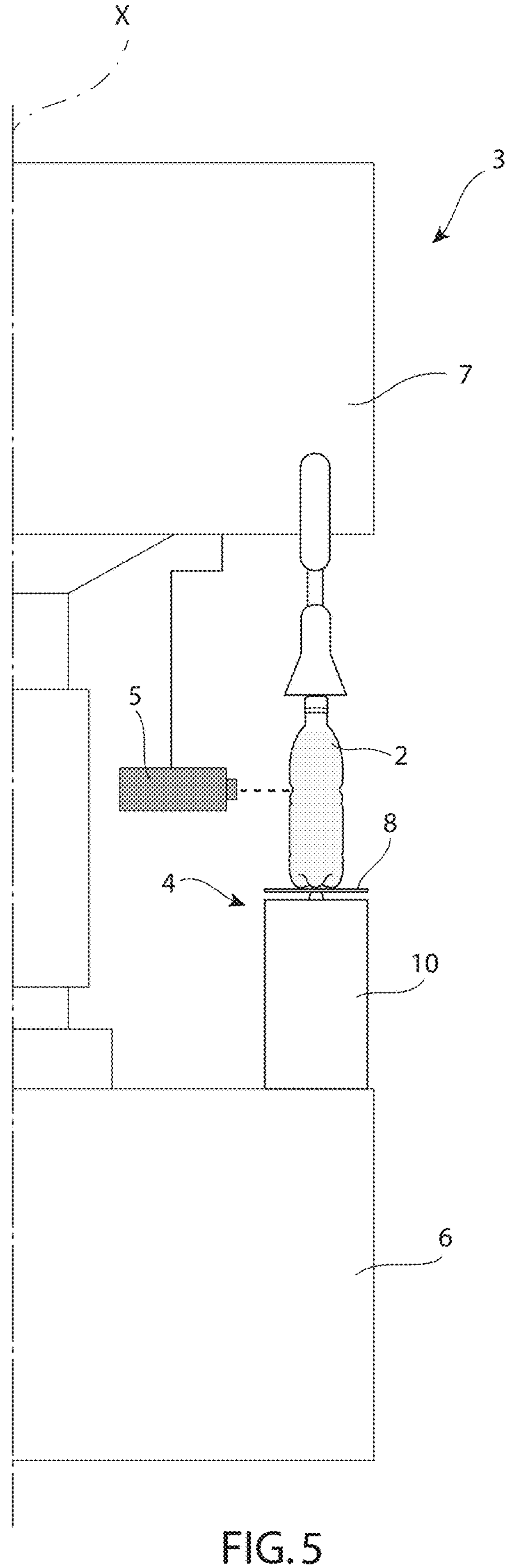
FIG. 5 is a schematic top view of the decoration machine showing the radially internal positioning of the decorating units with respect to the support members and containers.

Each decorating unit 5 is arranged in a position radially more internal than the associated support member 4, with respect to central axis X of the rotary conveyor 2, and therefore radially more internal with respect to the containers 3 carried on the support members 4, as shown in FIG. 5. As best shown in FIG. 5, each decorating unit 5 is mounted on the conveyor 2 in a position radially inward of the associated support member 4, such that the laser devices face radially outward toward the containers 3 supported on the support members 4.

Figure 2:
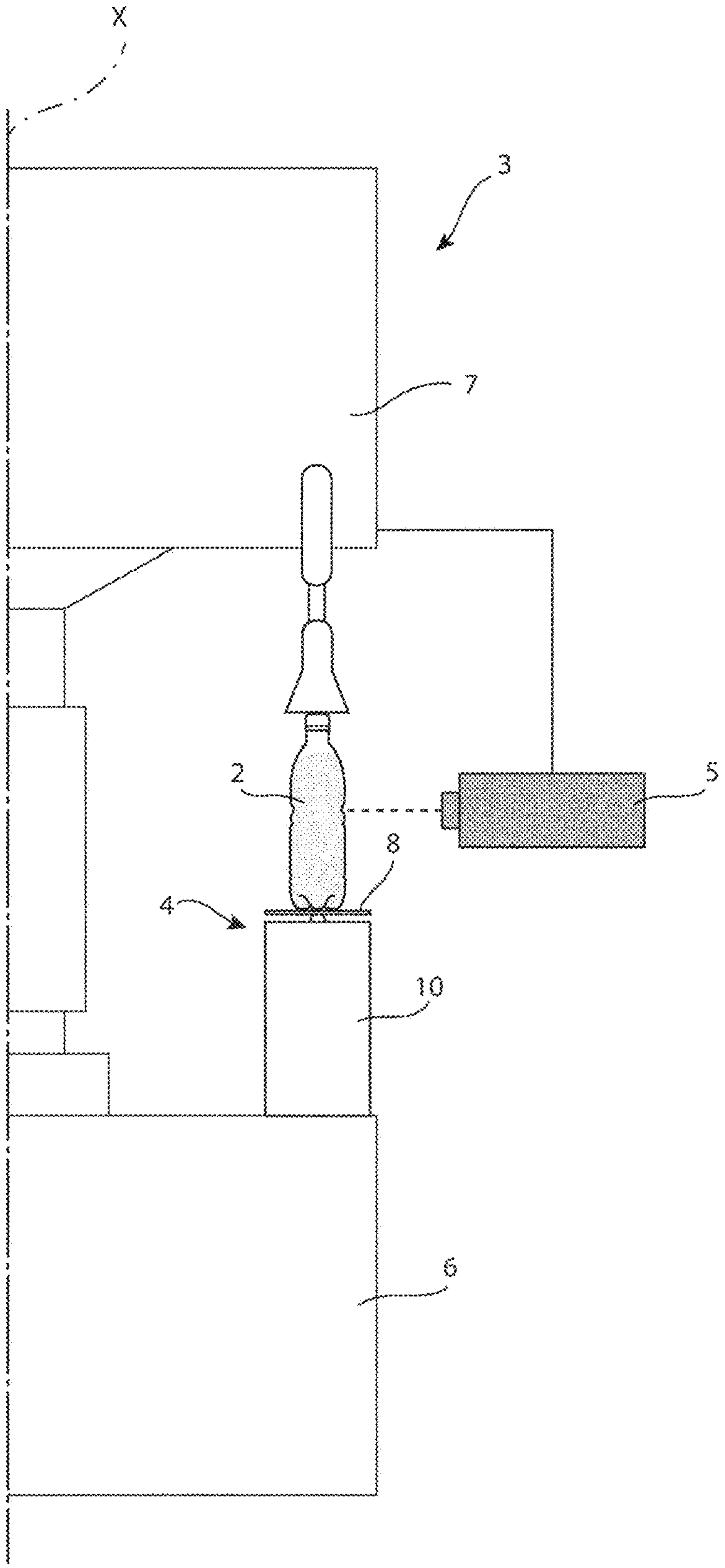
FIG. 2 is a larger-scale, schematic lateral semi-view, with parts removed for clarity, of part of the decoration machine of FIG. 1.
Figure 3:
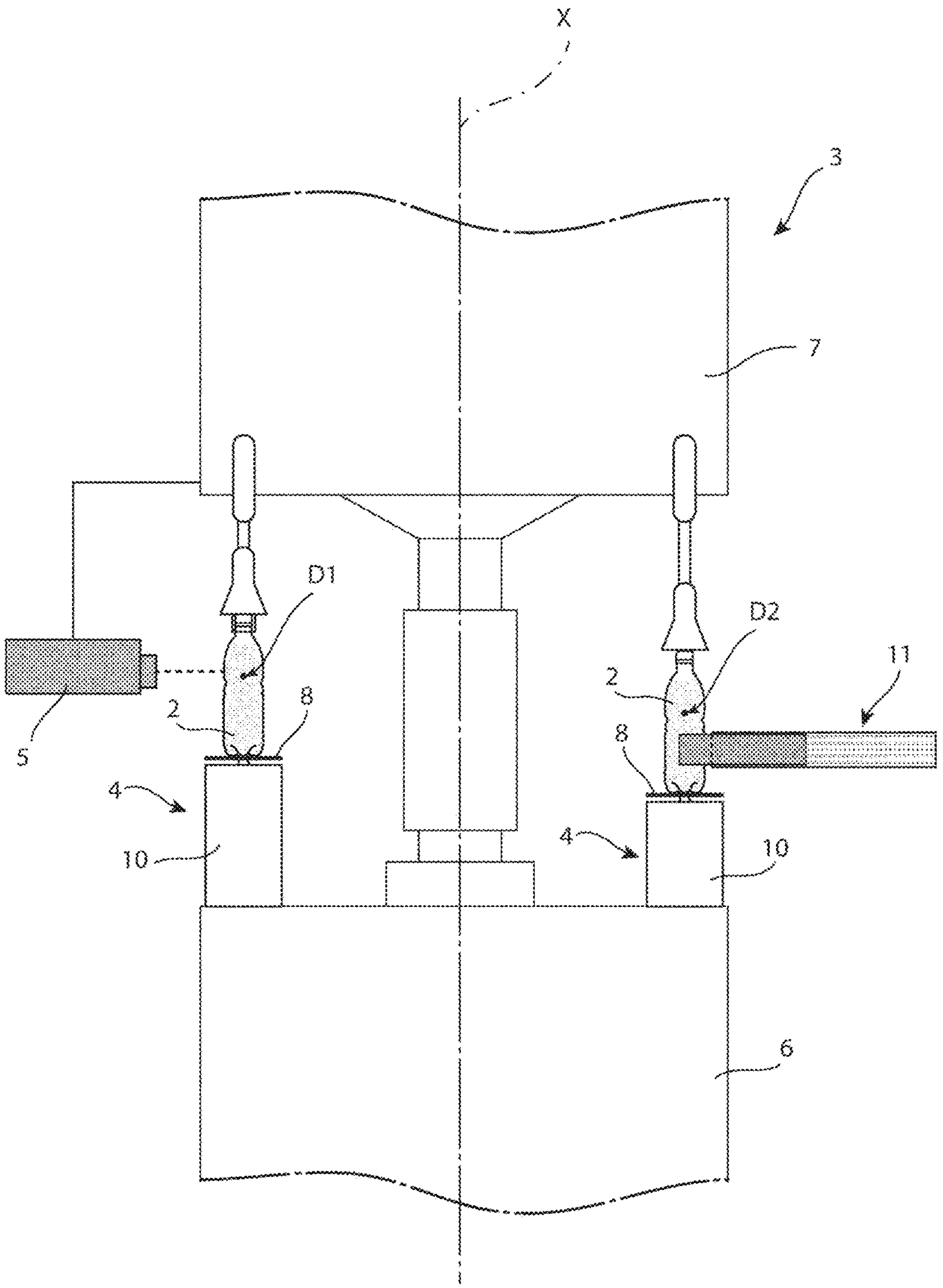
FIG. 3 is a larger-scale, schematic lateral view, with parts removed for clarity, of the decoration machine of FIG. 1 during a particular operative configuration.
Figure 4:
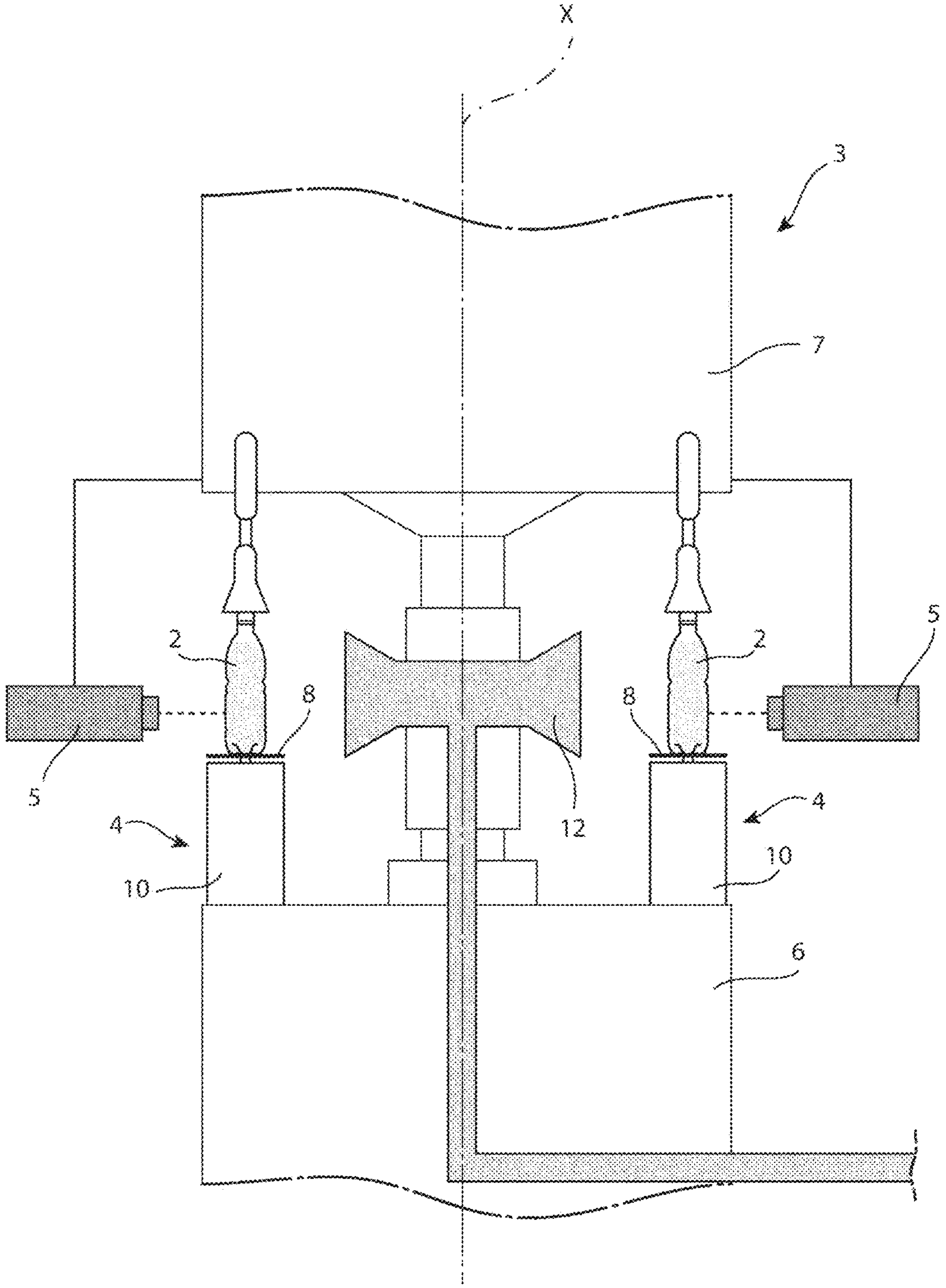
FIG. 4 is a larger-scale, schematic lateral view, with parts removed for clarity, of the decoration machine of FIG. 1 during another particular operative configuration.

As visible in FIGS. 2,3 and 4 carousel 3 has an axially lower frame 6 and an axially upper frame 7, with respect to the direction of gravity. That is, when carousel 3 is in use and standing on a fixed ground floor, lower frame 6 and upper frame 7 can be defined.

In the non-limiting example shown, laser devices 5 are mounted to upper frame 7 and support members 4 are mounted to lower frame 6.

This configuration further improves accessibility and simplifies the overall architecture and compactness of decoration machine 1, as it will be clear below.

According to a further aspect of the present invention, each laser device 5 is mounted to the carousel 3 in a movable manner, in the axial direction and/or in the radial direction, with respect to axis X, and relative to the associated support member 4. In this way each laser device 5 can be moved with respect to the associated support member 4.

Preferably, the laser devices 5 are movable in the axial direction and/or in the radial direction.

Conveniently, machine 1 comprises known actuators and a control unit for determining the aforementioned movement.

In this way, the decoration process can be easily adapted to specific needs or specific shapes or formats of containers 2.

In particular, the machine is configured for automatically moving each laser device 5 relatively to the associated support member 4, during a changeover operation or during production, based on at least one input of an operator.

In fact, thanks to each laser device 5 being radially and/or axially movable relatively to the associated support member 4 during production, automatically and based on at least one input from the operator:

- a decoration can be engraved along the entire axial length of the containers 2; and
- a precise control of the distance between the laser device 5 and the respective container 2 can be obtained, so that such distance is maintained constant during the entire decoration process, even when the decoration is to be engraved along the entire axial length of the container 2.

Also the changeover operation is made easier thanks to each laser device 5 being radially and/or axially movable with respect to the associated support member 4 during a changeover operation, automatically and based on at least one input of the operator.

Flexibility and adaptability of decoration machine 1 are thereby substantially improved without compromising the quality of the decoration and without the need for cumbersome adaptations and modifications, as it may be the case for the known labelling machines.

Conveniently, all the laser devices 5 are movable simultaneously in the axial direction and/or in the radial direction, during said changeover operation. A format changeover operation is a phase in which first type containers 2 are exchanged with second type containers 2. The changeover operation can be for example a format changeover operation, which is needed when the machine is switched from containers of a first format to containers of a second format.

A simultaneous movement of the laser devices 5 is in particular useful for the changeover operation.

In this way, flexibility of decoration machine 1 for format change is further improved and eased, and is applicable in a rather short timespan.

Each support member 4 comprises a respective support plate 8 for receiving and supporting a container 2.

Each support member 4 comprises a respective actuator 10 for automatically driving an axial movement of the plate 8, relatively to the carousel 3 and during production or a changeover operation.

The axial movement of each plate 10 during production is in particular useful for regulating the decoration process as a function of the position of the decoration along the longitudinal extension of the container. In particular, a variation of the decoration along said longitudinal extension can be more easily obtained.

A combined decorating process can in this way be provided, in which the laser device 5 and a labelling unit 11 work together for having a first part of the decoration made by the laser device 5 and a second part of the decoration made by a labelling unit 11.

The axial movement of each plate 10 is used also at the input station and at the output station where the containers are inputted in the carousel 3 and outputted by the carousel 3, in particular if the laser devices 5 are in a position which is radially more external than the support members 4. In fact, the axial movement at the input station and at the output station can avoid an interference between the flow of containers and the laser devices 5.

If the laser devices 5 are in a position which is radially more internal than the support members 4, according to the above mentioned not shown embodiment, the vertical axial movement of the plates at the input station and at the output station can be dispended with. Therefore, a solution with said more internal position of laser devices 5 requires less mechanical movements, reducing the wear of the machine.

The machine 1 is configured so that the labelling unit 11 labels sequentially the conveyed containers at least at a second angular position with respect to said axis X, and each laser device 5 decorates each container supported by the associated support member 4 at least at a first angular position with respect to said axis X. Therefore, for each container the respective first part of decoration which is made by the laser device 5 is made at least at the first angular position, and the respective second part of decoration which is made by the labelling unit 11 is made at least at the second angular position. The second position is different with respect to the first position. In this way the space is exploited in an optimized manner.

The machine 1 is configured so that the labelling unit 11 labels sequentially the conveyed containers at least at a second axial height with respect to said axis X and relatively to the carousel 3, and each laser device 5 decorates each container supported by the associated support member 4 at least at a first axial height with respect to said axis X and relatively to the carousel 3. The second height is different with respect to the first height. Therefore, for each container the respective first part of decoration which is made by the laser device 5 is made at least at the first axial height, and the respective second part of decoration which is made by the labelling unit 11 is made at least at the second axial height. The axial movement 10 of each plate 10 is in particular useful for providing the labelling unit 11 at a height which is different from the height at which the laser devices 5 decorate the containers. In this way, there is a further improvement in the exploitation of the space.

Preferably, each support member 4 comprises:

- a support plate 8 movably mounted to carousel 3 for receiving and supporting at least one container 2, preferably one container 2, at a time;
- an actuator 10 fixed to carousel 3 and coupled to plate 8 for driving a movement of plate 8 in the axial direction (with respect to axis X).

Preferably, actuator 10 is fitted to lower frame 6.

Preferably, plate 8 is coupled to actuator 10 so as to extend from an axial end thereof facing the upper frame 7.

In practice, plates 8 face upwards, ready to receive the respective containers 2.

Plates 8 are movable in the axial direction by the relative actuators 10 during their advancement along said circular path P, for adjusting an axial position of the containers 2 supported thereon during the decoration process (i.e. during the advancement of the containers along decoration path D), relative to axis X.

In other words, plates 8 are axially (and thus vertically) movable to adjust an axial position of the containers 2 relative to the respective laser devices 5.

This aspect of the invention allows for a further decoration of the containers 2 at a different section of decoration path D.

For example, decoration path D may comprise (FIG. 3):

- a first section D1 along which the laser engraving of the containers 2 takes place by means of laser devices 5; and
- a second section D2 along which a labelling of containers 2 takes place.

To this end, decoration machine 1 may further comprise the labelling unit 11, of the type known and not described in detail (and only the label applicator of which is schematically shown in FIG. 3 for illustrative purposes).

Accordingly, actuators 10 are configured to adjust the axial position of plates 8 so that the axial position of containers 2 in first section D1 is different than their axial position in second section D2, thereby allowing for the presence of labelling unit 11 together with laser devices 5 (at different axial heights).

For example, labelling unit 11 may be positioned at a lower axial height than laser devices 5, (i.e. at an axial position closer to lower frame 6 than laser devices 5), as shown in FIG. 3.

In this way, an even more flexible and multipurpose decoration machine 1 may be obtained.

Expediently, each actuator 10 is further configured to control a rotation of the respective plate 8 on itself (about its own axis) and with respect to the carousel 3, so that the associated laser device 5 may engrave the outer lateral surface of the container 2 for up to the entire angular extension thereof.

That is, plates 8 are rotatable about their own respective axes with respect to the carousel. The rotation of the plate 8 on itself can allow the laser device 5 to make the decoration over a required angular sector of the container.

This feature allows for an even more flexible and adaptable engraving decoration process of containers 2, obtainable with a simple control implementation of actuators 10, for example by means of a known associated control unit. Hence, there is no need for complicated changes in decoration machine 1 or even for stopping decoration machine 1, which can therefore undergo an on-the-fly format change.

According to a preferred embodiment schematized in FIG. 4, decoration machine 1 further comprises an aspirator device 12 configured for sucking residual particles of each container 2 following the engraving thereof by means of the associated laser device 5.

In this way, safety of the machine and cleanliness of the decoration process are further improved.

According to an alternative embodiment of the invention, each decorating unit 5 includes, instead or in addition to the laser device, an ink printer for ink-printing a decoration onto the outer surface of each container 2 supported by the respective support member 4.

In this case, the aspirator device can be dispensed with, or the power for driving the aspirator device can be lower.

Furthermore, in this case, the printers are conveniently radially movable for reaching the containers 2 to be decorated, cyclically.

Thanks to the fact that ink printer 5 follows the movement of the respective support member 4 and is integral in rotation with carousel 3, the same advantages already explained in connection with the laser devices 5 can be obtained.

The advantages of decoration machine 1 according to the present invention will be clear from the foregoing description.

In particular, since each decorating unit 5 is integral with the rotation of carousel 3 and follows the respective support member 4, a proper decoration (printing or engraving) of the containers 2 can be obtained.

The quality of the decoration is therefore improved in an easy and simple manner.

Moreover, since no glue or web of labelling material is needed for the decoration process according to the invention, the consumption of raw materials is largely reduced.

Furthermore, for the same reason, the cleanliness of the decoration process is largely improved (due to no use of glue).

In addition, the decoration machine 1 according to the invention allows for avoiding undesired mispositioning of the decorations (such as labels) on containers 2, for example due to glue misapplication. In fact, the decorations are now totally embedded on the outer surface of the containers 2 and cannot move thereon.

Moreover, in case laser devices 5 are radially external with respect to support members 4, the safety of the decoration process is substantially improved.

Furthermore, thanks to the presence of aspirator device 12, cleanliness of the decoration process is further improved.

In addition, thanks to the fact that decoration units 5 and/or support members are axially and/or radially movable, the decoration process can be easily adapted to specific needs or specific shapes of containers 2. In fact, thanks to the above configuration a decoration can be engraved along the entire axial length of the containers 2 and a precise control of the distance between the laser device 5 and the respective container 2 can be obtained, so that such distance is maintained constant during the entire decoration process, even when the decoration is to be engraved along the entire axial length of the container 2. Consequently, flexibility and adaptability of decoration machine 1 are substantially improved, without the need for cumbersome adaptations and modifications, as it may be the case for the known labelling machines. This also results in an easier format change (or change-over), which can even be performed on-the-fly during production and without the need for stopping decoration machine 1.

In addition, thanks to the fact that support members 4 may be axially movable, thereby regulating the axial position of the containers 2, a further decoration may be added, for example a label application. In this way, an even more flexible and multipurpose decoration machine 1 may be obtained.

Clearly, changes may be made to decoration machine 1 as described herein without, however, departing from the scope of protection as defined in the accompanying claims.

In particular, some of the decorating units 5 may be laser devices while other decorating units 5 may be ink printers, thereby further increasing flexibility of decoration machine 1.

The invention claimed is:

1. A decoration machine for decorating containers adapted to contain a pourable product, the machine comprising:

a rotary conveyor for conveying a plurality of containers along a decoration path by means of a rotary movement;

a plurality of support members mounted on the conveyor for being advanced by the conveyor along the decoration path, each support member being integral with said rotary movement and configured to support in advancement a respective container;

a plurality of decorating units comprising laser devices each configured to print or engrave a decoration on a respective container; and wherein each decorating unit is mounted on the conveyor, is integral with the rotary movement of the conveyor, is integral in movement with the respective associated support member and radially faces towards the same respective support member while both are conveyed in rotation by the conveyor, and is arranged for decorating each container being supported and conveyed along decoration path by a respective support member, each decorating unit being associated to the respective support member, for printing or engraving a decoration on the respective container supported and conveyed thereon, wherein each decorating unit is arranged in a position radially more internal than the associated support member, with respect to a central axis of the rotary conveyor, and therefore radially more internal with respect to the containers carried on the support members.

2. The decoration machine as claimed in claim 1, wherein the conveyor comprises a carousel rotatable about a central axis, so that said decoration path is arc-shaped, the support members are mounted on a radial periphery of the carousel, with respect to said axis, wherein the decorating units (5) are mounted on said periphery.

3. The decoration machine as claimed in claim 2, wherein the carousel has an axially lower frame and an axially upper frame, with respect to direction of gravity; and wherein the decorating units are mounted on the upper frame and the support members are mounted on the lower frame.

4. The decoration machine as claimed in claim 2, wherein:

each of the decorating units is mounted on the carousel in a movable manner, in an axial direction and/or in a radial direction, with respect to axis X, and relatively to the associated support member; and the machine is configured for axially and/or radially moving each of the decorating units relatively to the associated support member, during a changeover operation or during production, automatically and based on at least one input of an operator.

5. The decoration machine as claimed in claim 4, wherein all the decorating units are movable simultaneously in the axial direction and/or in the radial direction.

6. The decoration machine as claimed in claim 4, wherein each support member (4) comprises:

a respective support plate for receiving and supporting a container; and a respective actuator for automatically driving an axial movement of the plate, relatively to the carousel, based on at least one input of an operator and during production or a changeover operation.

7. The decoration machine as claimed in claim 6, comprising a labelling unit; wherein the machine is configured so that the labelling unit labels sequentially the conveyed containers at least at a second angular position with respect to said axis (X) and each decorating unit decorates each container supported by the associated support member at least at a first angular position with respect to said axis (X), the second angular position being different with respect to the first angular position.

8. The decoration machine according to claim 7, wherein the machine is configured so that the labelling unit labels sequentially the conveyed containers at least at a second axial height with respect to said axis (X) and relatively to the carousel, and each decorating unit decorates each container supported by the associated support member at least at a first axial height with respect to said axis (X) and relatively to the carousel, the second height being different with respect to the first height.

9. The decoration machine as claimed in claim 1, and further comprising an aspirator device configured for sucking residual particles of each container following the engraving thereof by means of the laser devices.

* * * * *